(12) United States Patent
Liu et al.

(10) Patent No.: US 12,504,033 B2
(45) Date of Patent: Dec. 23, 2025

(54) FASTENING ASSEMBLY AND FASTENING SYSTEM COMPRISING SAME

(71) Applicant: Illinois Tool Works Inc., Glenview, IL (US)

(72) Inventors: Weibin Liu, Shanghai (CN); Zhilin Li, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 162 days.

(21) Appl. No.: 18/234,494

(22) Filed: Aug. 16, 2023

(65) Prior Publication Data
US 2024/0060523 A1    Feb. 22, 2024

(30) Foreign Application Priority Data
Aug. 17, 2022 (CN) .......................... 202210985777.2

(51) Int. Cl.
F16B 5/02    (2006.01)
F16B 29/00    (2006.01)

(52) U.S. Cl.
CPC ............ *F16B 29/00* (2013.01); *F16B 5/0283* (2013.01)

(58) Field of Classification Search
CPC ...... F16B 5/0233; F16B 5/025; F16B 5/0283; F16B 5/0225
USPC ......................................................... 411/546
See application file for complete search history.

(56) References Cited

U.S. PATENT DOCUMENTS

| | | | | |
|---|---|---|---|---|
| 4,662,807 A | * | 5/1987 | Lien ...................... | F16B 5/0283 411/389 |
| 4,846,622 A | * | 7/1989 | Lien ...................... | E06B 1/6076 411/389 |
| 6,167,663 B1 | * | 1/2001 | Nakamoto ............ | F16B 5/0283 52/204.56 |
| 6,702,503 B2 | * | 3/2004 | Pinzl ..................... | F16B 5/0233 403/348 |
| 8,337,132 B2 | * | 12/2012 | Steffenfauseweh .. | B60Q 1/0433 411/546 |
| 2005/0074276 A1 | * | 4/2005 | Luetze ................. | B60Q 1/0433 403/14 |
| 2018/0023608 A1 | * | 1/2018 | Matsushima ......... | F16F 1/3732 411/37 |
| 2023/0138722 A1 | * | 5/2023 | Alstad ................... | F16C 35/063 403/408.1 |

(Continued)

*Primary Examiner* — Flemming Saether
(74) *Attorney, Agent, or Firm* — McAndrews, Held & Malloy, Ltd.

(57) ABSTRACT

A fastening assembly is provided which comprises a compensating element and an isolating member. The compensating element comprises a body having a receiving hole and a retaining flange provided at a first end of the body and having a retaining hole. The isolating member is made of metal and comprises a sleeve portion defining a channel. A fastening element inserted from a second end of the body of the compensating element can enter the channel and move in the channel in one or more lateral directions. The sleeve portion is inserted into the retaining hole and cooperates with the retaining hole to retain the isolating member in the compensating element. The fastening element fastens the compensating element to the second component via the sleeve portion, and the sleeve portion is configured to withstand an axial fastening force exerted by the fastening element on the retaining flange of the compensating element.

20 Claims, 6 Drawing Sheets

(56) References Cited

U.S. PATENT DOCUMENTS

2023/0383773 A1* 11/2023 Bente ...................... F16B 2/005
2023/0407895 A1* 12/2023 Mücke .................. F16B 5/0233

* cited by examiner

FASTENING ASSEMBLY AND FASTENING SYSTEM COMPRISING SAME

RELATED APPLICATION

The present application claims the benefit of Chinese Patent Application No. 2022109857772, filed Aug. 17, 2022, the contents of which are hereby incorporated by reference.

TECHNICAL FIELD

The embodiments of the present disclosure generally relate to a fastening assembly, and more particularly to a fastening assembly configured to fasten a first component to a second component and be capable of compensating for tolerances.

BACKGROUND

A fastening assembly with a tolerance compensating function can compensate for tolerances caused by manufacturing and mounting while fastening two components. This fastening assembly typically comprises a threaded fastening element, and components are fastened by applying torque to the threaded fastening element.

SUMMARY

According to a first aspect of the present disclosure, the present disclosure provides a fastening assembly configured to cooperate with a fastening element to fasten a first component to a second component. The fastening assembly comprises a compensating element and an isolating member. The compensating element comprises a body and a retaining flange, the body having a first end and a second end opposite each other and having a receiving hole penetrating the first end and the second end. The retaining flange is provided at the first end of the body, the retaining flange extends inwardly from a hole wall of the receiving hole and has a retaining hole in axial connection with the receiving hole, and the compensating element is configured to connectable to the first component and to be movable in a longitudinal direction relative to the first component to compensate for tolerances in the longitudinal direction. The isolating member is made of metal. The isolating member comprises a sleeve portion, the sleeve portion defines a channel, and the channel is configured such that the fastening element inserted from the second end of the body of the compensating element is capable of entering the channel and moving in one or more lateral directions perpendicular to the longitudinal direction to compensate for tolerances in the one or more lateral directions. The sleeve portion is inserted into the retaining hole, and cooperates with the retaining hole to retain the isolating member on the compensating element. The fastening element fastens the compensating element to the second component through the sleeve portion, and the sleeve portion is configured to withstand an axial fastening force exerted by the fastening element on the retaining flange of the compensating element.

According to the fastening assembly of the first aspect, the sleeve portion has a first axial end and a second axial end opposite each other. One of the first axial end and the second axial end withstands a pressure exerted by the fastening element, and the other of the first axial end and the second axial end withstands a pressure exerted by the second component.

According to the fastening assembly of the first aspect, the isolating member further comprises a flange portion protruding outwardly from the first axial end of the sleeve portion. The flange portion is positioned on one of an outer side and an inner side of the retaining flange of the compensating element, and the second axial end of the sleeve portion extends into the retaining hole of the retaining flange and extends toward the other of the outer side and the inner side of the retaining flange to be flush with or slightly beyond a surface of the retaining flange on this side.

According to the fastening assembly of the first aspect, a plurality of retaining ribs are provided on the hole wall of the retaining hole, and an outer surface of the sleeve portion is in an interference fit with the retaining ribs, so as to retain the isolating member on the compensating element.

According to the fastening assembly of the first aspect, the plurality of retaining ribs are evenly arranged in a circumferential direction of the retaining hole, and each of the retaining ribs extends in the longitudinal direction.

According to the fastening assembly of the first aspect, the body of the compensating element is cylindrical, and an outer surface of the body is provided with a spiral groove, and the body connects the compensating element to the first component through the spiral groove. The compensating element comprises a first stop structure and a second stop structure respectively provided at the first end and the second end of the body, the first stop structure and the second stop structure are configured such that the compensating element is capable of being inserted into a hole of the first component and blocking the compensating element from falling out of the hole of the first component to pre-assemble the fastening assembly to the first component.

According to the fastening assembly of the first aspect, one of the first stop structure and the second stop structure is a first stop block disposed at an end of the spiral groove, and the other of the first stop structure and the second stop structure comprises a deflectable arm and a second stop block provided on the deflectable arm.

According to the fastening assembly of the first aspect, the deflectable arm extends substantially parallel to the spiral groove.

According to a second aspect of the present disclosure, the present disclosure provides a fastening system configured to fasten the first component to the second component. The fastening system comprises a fastening assembly according to the first aspect, a fastening element, and a nut device provided on the second component. The fastening element engages with the nut device to fasten the first component to the second component.

According to the fastening system of the second aspect, a metal washer is further comprised. The metal washer is clamped between a head of the fastening element and the retaining flange.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Various specific embodiments of the present disclosure are described below with reference to the accompanying drawings which constitute part of this description. It is to be understood that although the terms indicating orientations, such as "front", "rear", "upper", "lower", "left", "right", "top" and "bottom", are used in the present disclosure to describe structural parts and elements in various examples of the present disclosure, these terms are used herein only for ease of illustration and are determined based on the exemplary orientations shown in the accompanying drawings. Since the embodiments disclosed in the present disclosure can be arranged in different directions, these terms indicating directions are only illustrative and should not be considered as limitations.

The embodiments of the present disclosure provide a fastening assembly, which is configured to cooperate with a fastening element (e.g., a screw) to fasten a first component (e.g., a hidden door handle module of a vehicle) to a second component (e.g., a vehicle door), and the fastening assembly also has a tolerance compensating function and thus can compensate for tolerances caused by the manufacturing and mounting of components. The embodiments of the present disclosure further provide a fastening system comprising the above-mentioned fastening assembly.

Figure 1A:
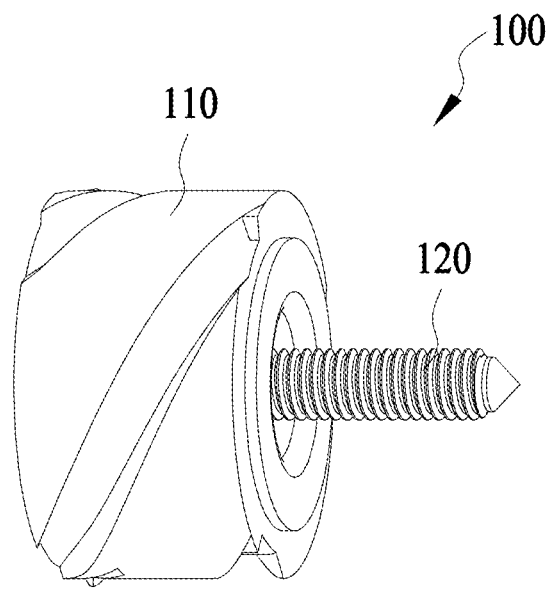
FIG. 1A is a perspective view of a fastening system according to an embodiment of the present disclosure.
Figure 1B:
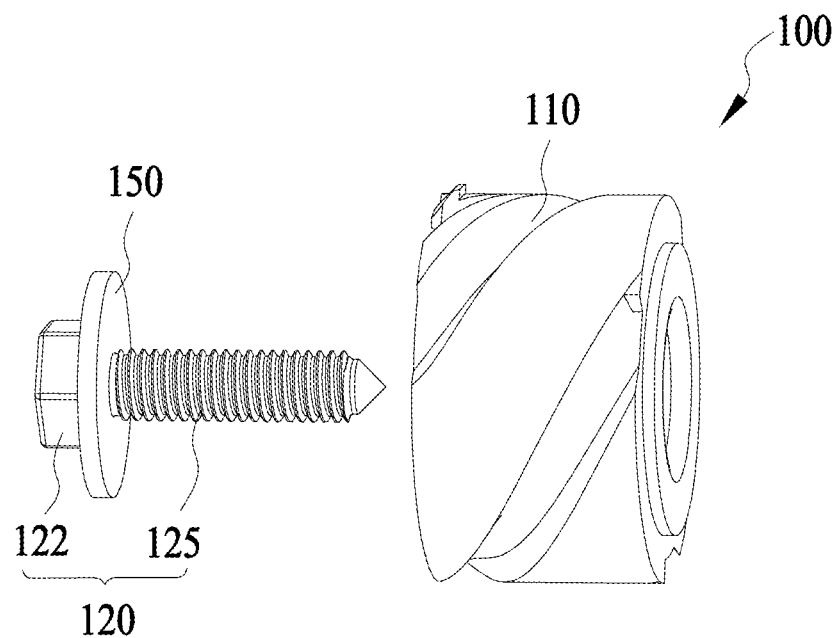
FIG. 1B is a partially exploded view of the fastening system shown in FIG. 1A.
Figure 1C:
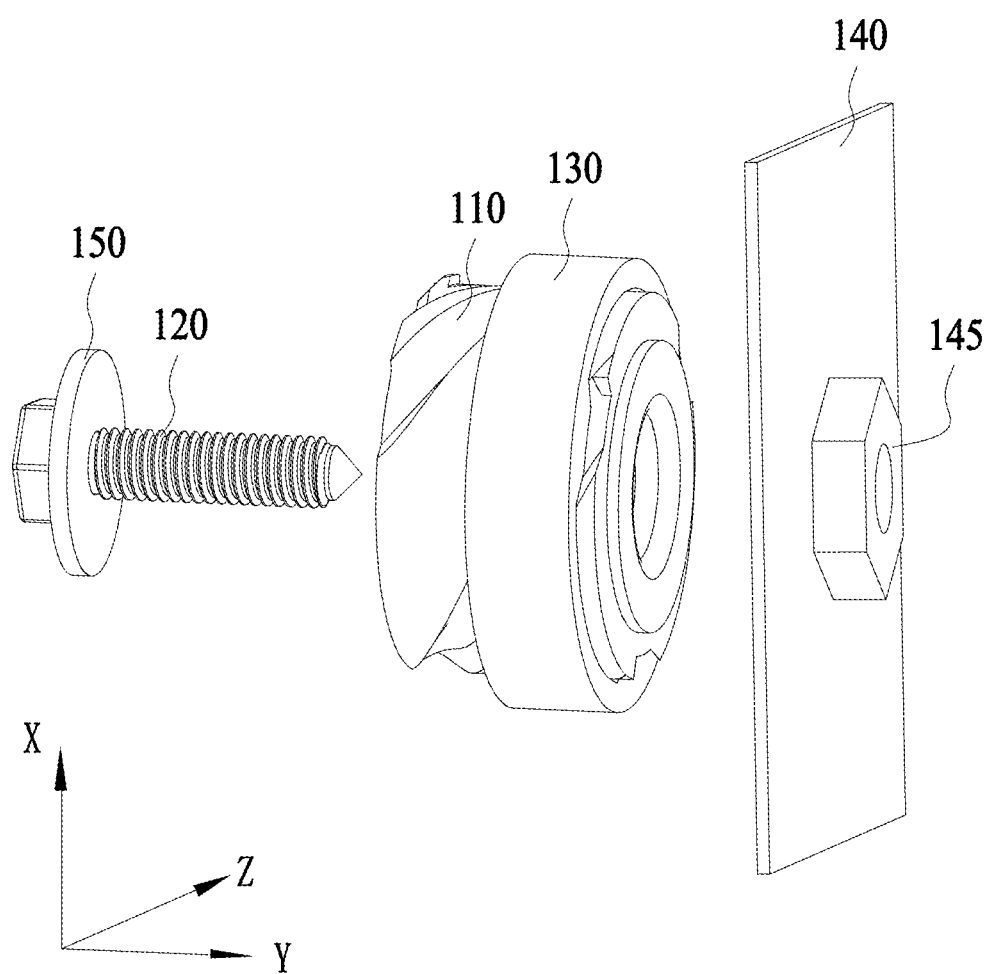
FIG. 1C is a view showing an assembly process of the fastening system shown in FIG. 1A.

FIGS. 1A-1C show an overall structure of a fastening system 100 according to an embodiment of the present disclosure, among which FIG. 1A is a perspective view of the fastening system 100, FIG. 1B is a partially exploded view of the fastening system 100, and FIG. 1C is a view showing an assembly process of the fastening system 100. As shown in FIGS. 1A-1C, the fastening system 100 is configured to fasten a first component 130 to a second component 140. The first component 130 is a hidden door handle module of a vehicle, for example, and to illustrate the fastening system of the present disclosure more clearly, the first component 130 and the second component 140 are shown in the figures with simplified structures. The fastening system 100 comprises a fastening assembly 110, a fastening element 120 and a metal washer 150. The fastening element 120 is a nut, for example, which has a head 122 and a shaft portion 125. The fastening assembly 110 can be pre-assembled to the first component 130, the second component 140 is provided with a nut device 145, and the fastening element 120 can pass through the fastening assembly 110 to engage with the nut device 145 of the second component 140, so as to clamp part of the fastening assembly 110 between the washer 150 and the second component 140, thereby fastening the first component 130 to the second component 140 via the fastening system 100. During a fastening operation, the fastening assembly 110 can move relative to the first component 130 in a longitudinal direction Y, so as to compensate for tolerances in the longitudinal direction Y, while the fastening element 120 can move in the fastening assembly 110 in one or more lateral directions X, Z perpendicular to the longitudinal direction Y, so as to compensate for tolerances in the one or more lateral directions X, Z. Therefore, the fastening system 100, while being able to compensate for tolerances in various directions resulting from manufacturing during the fastening operation, can fasten the first component 130 to the second component 140. When there is more than one mounting position on the first component 130, the above-mentioned function of compensating for the tolerances is particularly important, because each position needs a fastening system, and if a position has manufacturing tolerances that are not compensated for, it can lead to the inability to align components at other positions, resulting in the inability to perform a fastening operation at that position.

Figure 2A:
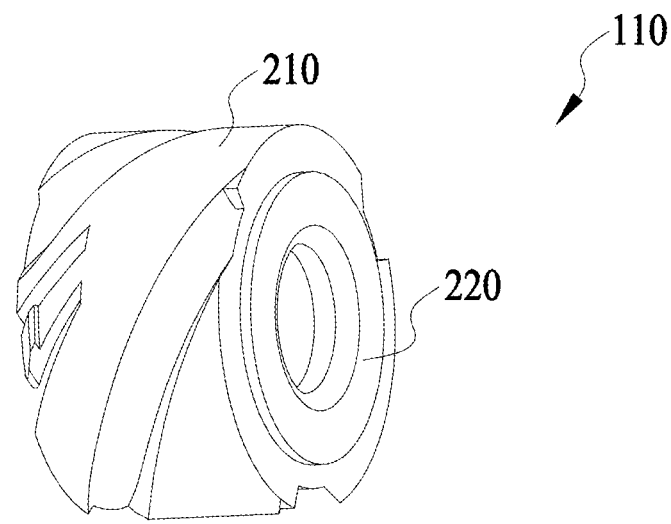
FIG. 2A is a perspective view of a fastening assembly according to an embodiment of the present disclosure.
Figure 2B:
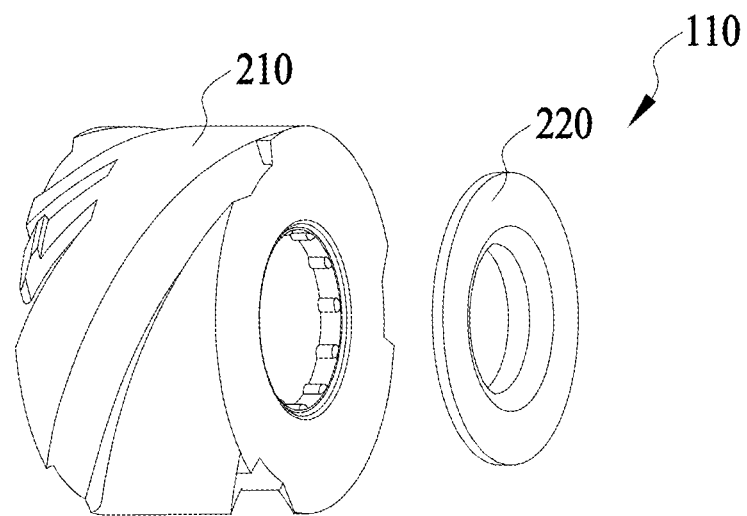
FIG. 2B is an exploded view of the fastening assembly shown in FIG. 2A.

FIGS. 2A-5 show the specific structure of the fastening assembly 110 of the fastening system 100 in FIG. 1A according to an embodiment. FIGS. 2A and 2B respectively illustrate an overall structure of the fastening assembly 110 in a perspective view and an exploded view. As shown in FIGS. 2A and 2B, the fastening assembly 110 comprises a compensating element 210 and an isolating member 220, and the isolating member 220 is retained on the compensating element 210. The compensating element 210 is made of a plastic material, and the isolating member 220 is made of a metal material.

Figure 3A:
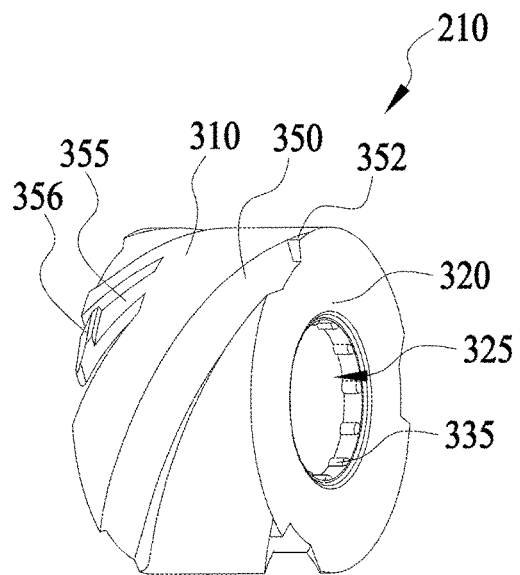
FIG. 3A is a perspective view of a compensating element of the fastening assembly shown in FIG. 2A from a first perspective.
Figure 3B:
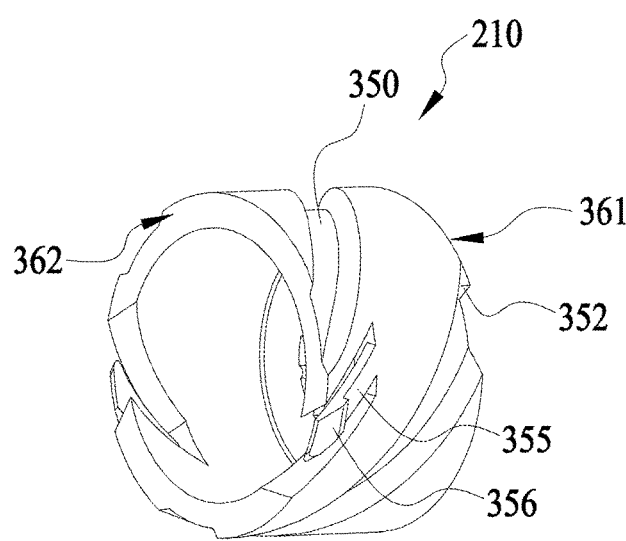
FIG. 3B is a perspective view of the compensating element of the fastening assembly shown in FIG. 2A from a second perspective.
Figure 3C:
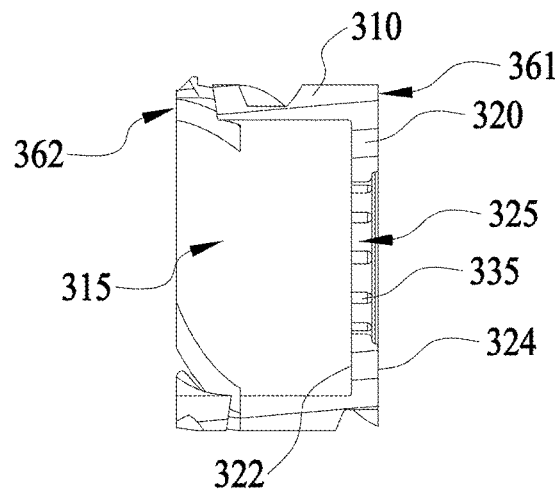
FIG. 3C is a sectional view of the fastening assembly shown in FIG. 2A taken in an axial direction.

FIGS. 3A-3C show the specific structure of the compensating element 210 of the fastening assembly 110, among which FIGS. 3A and 3B are respectively perspective views of the compensating element 210 in different perspectives, and FIG. 3C is a sectional view of the compensating element 210 taken in an axial direction. As shown in FIGS. 3A-3C, the compensating element 210 comprises a cylindrical body 310 and a retaining flange 320 provided on the cylindrical body 310. The body 310 has a receiving hole 315 for receiving the fastening element 120. The body 310 further comprises a first end 361 and a second end 362 respectively at two axial ends thereof. The retaining flange 320 is provided at the first end 361 of the body 310 and extends inwardly from a hole wall of the receiving hole 315. The retaining flange 320 has a retaining hole 325 in axial connection with the receiving hole 315. Therefore, the retaining flange 320 is annular, and the radial dimension of the retaining hole 325 is smaller than that of the receiving hole 315. A plurality of retaining ribs 335 are provided on the hole wall of the retaining hole 325, each retaining rib 335 extends substantially in the longitudinal direction Y, and the plurality of retaining ribs are evenly arranged along the circumference of the retaining hole 325. The retaining flange 320 has an inner side surface 322 and an outer side surface 324 opposite each other.

Figure 7:
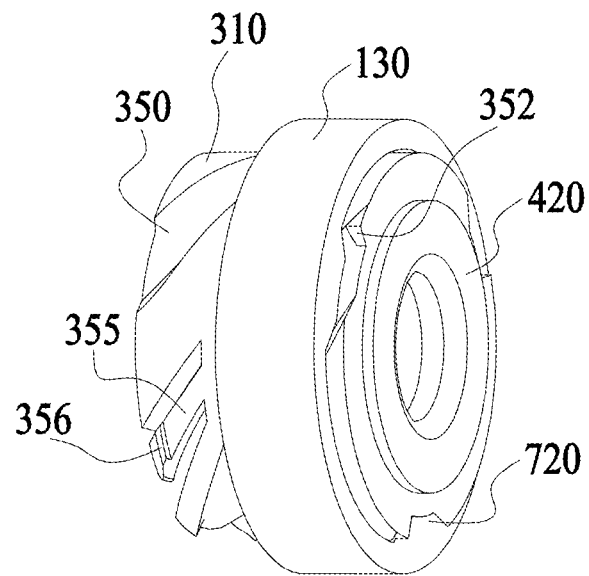
FIG. 7 is a perspective view of the fastening assembly shown in FIG. 2A that is pre-assembled with a first component.

The compensating element 210 is provided with a spiral groove 350 at an outer surface of the body 310 thereof. The spiral groove 350 is configured to cooperate with a protrusion (a protrusion 720 as shown in FIG. 7) provided in the hole of the first component 130 to connect the compensating element 210 with the first component 130 and enable the compensating element 210 to move relative to the first component 130 in the longitudinal direction Y. The compensating element 210 comprises a first stop structure and a second stop structure respectively at the first end 361 and the second end 362, and the first stop structure and the second stop structure are configured to enable the compensating element 210 to be inserted into the hole of the first component 130 and block the compensating element 210 from falling out of the hole of the first component 130, so as to pre-assemble the fastening assembly 110 to the first component 130. In the embodiment shown in the figures, the first stop structure is a first stop block 352 provided at the end of the spiral groove 350. The first stop blocks 352 is in the spiral groove 350, that is, in a travel path of the protrusion 720 of the first component 130 in the spiral groove 350, and thus can block the protrusion 720 of the first component 130 from moving out of the spiral groove 350. The second stop structure comprises a deflectable arm 355 provided outside the spiral groove 350 and a second stop block 356 provided on the deflectable arm 355. The deflectable arm 355 is connected to the body 310 at a proximal end thereof, and the second stop block 356 is provided on an outer surface of a distal end of the deflectable arm 355. The deflectable arm 355 is formed by providing openings on the body 310, and extends substantially parallel to the spiral groove 350.

Since the deflectable arm 355 can be deflected about the proximal end thereof toward the receiving hole 315 of the body 310 under pressure, the second stop block 352 on the deflectable arm 355 can be moved from a blocking position thereof. Therefore, the compensating element 210 can be inserted into the hole of the first component 130 from the end (the second end 362) at which the deflectable arm 355 is provided. In addition, the second stop block 352 can be restored to the blocking position by the rebound of the deflectable arm 355, thereby blocking the first component 130 from detaching from the compensating element 210 from the second end 362 of the body 310 of the compensating element 210. The first stop block 352 can block the first component 130 from detaching from the compensating element 210 from the first end 361 of the body 310 of the compensating element 210 by means of cooperating with the protrusion 720 arranged in the hole of the first component 130. Thereby, the first stop structure and the second stop structure not only does not affect the connection of the compensating element 210 to the first component 130, but can also block the compensating element 210 from falling out of the hole of the first component 130, thus enabling the fastening assembly 110 to be pre-assembled on the first component 130.

In the illustrated embodiment, the first stop structure is a stop block arranged in the spiral groove, and the second stop structure comprises a deflectable arm and a stop block arranged on the deflectable arm, but in other embodiments, the forms of the first stop structure and the second stop structure can be interchanged. The number of the first stop structure and the second stop structure can be one or more respectively. The number of the first stop structure is related to that of the spiral groove 350, and one first stop structure can be provided at the end of each spiral groove 250. If the number of the second stop structure is more than one, the second stop structures are evenly arranged around an axis of the body 310.

Figure 4A:
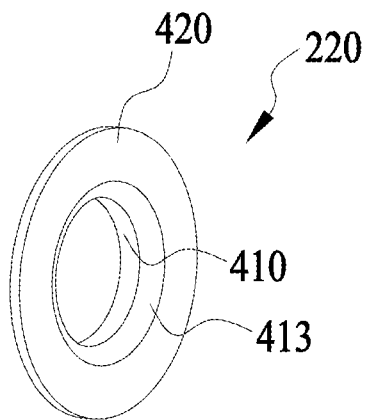
FIG. 4A is a perspective view of an isolating member of the fastening assembly shown in FIG. 2A from a first perspective.
Figure 4B:
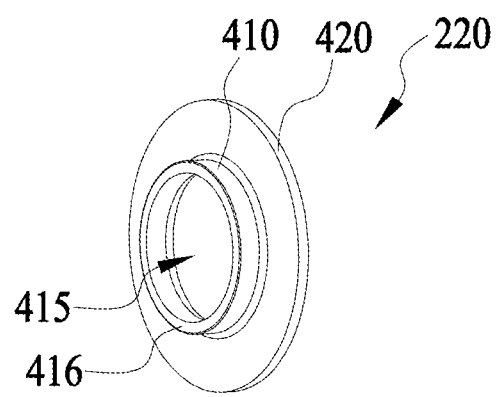
FIG. 4B is a perspective view of the isolating member of the fastening assembly shown in FIG. 2A from a second perspective.

FIGS. 4A and 4B show a specific structure of the isolating member 220 of the fastening assembly 110, among which FIG. 4A is a perspective view of the isolating member 220 from a first perspective, and FIG. 4B is a perspective view of the isolating member 220 from a second perspective. As shown in FIGS. 4A and 4B, the isolating member 220 is made of metal, and comprises a sleeve portion 410 and a flange portion 420. The sleeve portion 410 defines a channel 415, and has a first axial end 413 and a second axial end 416 opposite each other. The channel 415 is configured such that the fastening element 120 inserted from the second end 362 of the body 310 of the compensating element 210 is capable of entering the channel 415 and moving in the channel 415 in one or more lateral directions X, Z perpendicular to the longitudinal direction Y to compensate for tolerances in the one or more lateral directions X, Z. In some embodiments, the sleeve portion 410 is cylindrical, and has an inner diameter greater than an outer diameter of the shaft portion 125 of the fastening element 120. The flange portion 420 protrudes outwardly from the first axial end 413 of the sleeve portion 410, and forms a generally annular structure.

Figure 5:
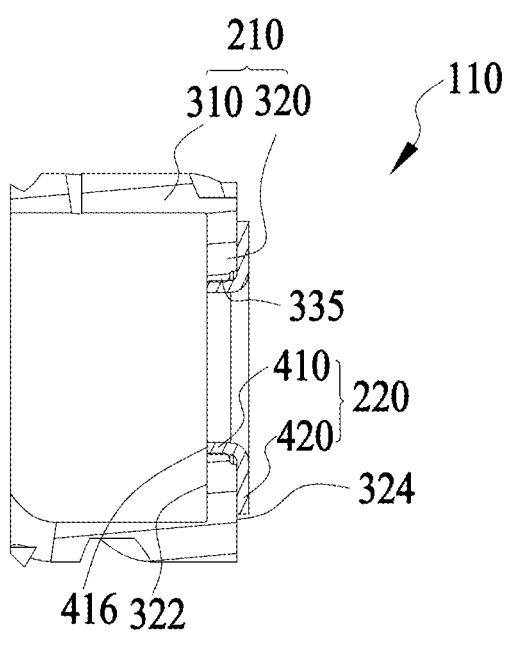
FIG. 5 is a sectional view of the fastening assembly shown in FIG. 2A taken in an axial direction.

FIG. 5 is a sectional view of the fastening assembly 110 taken in the axial direction, showing an assembly relationship of the compensating element 210 and the isolating member 220 of the fastening assembly 110. As shown in FIG. 5, the flange portion 420 of the isolating member 220 is on an outer side of the retaining flange 320 of the compensating element 210 and abuts against the outer side surface 324 of the retaining flange 320. The second axial end 416 of the sleeve portion 410 extends into the retaining hole 325 of the retaining flange 320, and extends toward an inner side of the retaining flange 320 to be flush with or slightly beyond the inner side surface 322 of the retaining flange 320. An outer surface of the sleeve portion 410 of the isolating member 220 is in an interference fit with the retaining rib 335 provided on the hole wall of the retaining hole 325 of the retaining flange 320, so that the isolating member 220 can be retained on the compensating element 210. Since the isolating member 220 can be retained on the compensating element 210, by means of cooperation of the spiral groove 350 on the body 310 of the compensating element 210 with the first component 130, the fastening assembly 110 (comprising the compensating element 210 and the isolating member 220) can be pre-assembled on the first component 130.

Figure 6:
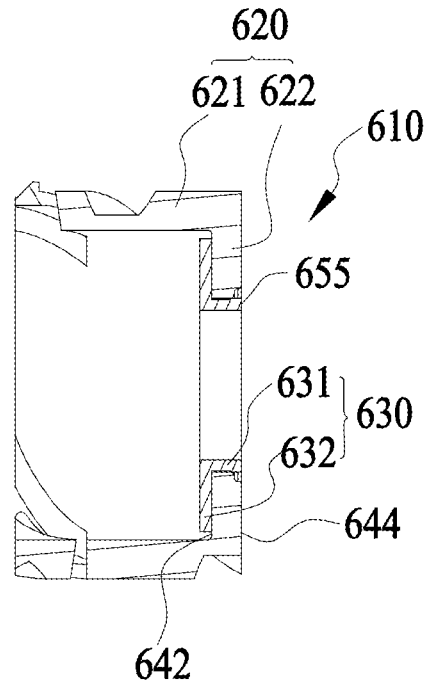
FIG. 6 is a sectional view of a fastening assembly according to another embodiment of the present disclosure taken in an axial direction.

FIG. 6 is a sectional view of a fastening assembly 610 according to another embodiment of the present disclosure taken in the axial direction. The fastening assembly 610 according to the embodiment shown in FIG. 6 also comprises a compensating element 620 and an isolating member 630, the compensating element 620 is structurally identical to the compensating element 210 according to the embodiments shown in FIG. 2A to FIG. 5, and the isolating member 630 is structurally identical to the isolating member 220 according to the embodiments shown in FIG. 2A to FIG. 5. The difference between the fastening assembly 610 according to the embodiment shown in FIG. 6 and the fastening assembly 110 according to the embodiments shown in FIG. 2A to FIG. 5 merely lies in that the mounting direction of the isolating member on the compensating element is different.

In the fastening assembly 110 according to the embodiments shown in FIG. 2A to FIG. 5, the isolating member 220 is inserted into the compensating element 210 from the first end 361 (that is, the direction from right to left as shown in FIG. 5) of the body 310 of the compensating element 210, and the flange portion 420 is located on the outer side of the retaining flange 320, while in the fastening assembly 610 according to the embodiment shown in FIG. 6, the isolating member 220 is inserted into the compensating element 210 from the second end 362 (that is, the direction from left to right as shown in FIG. 6) of the body 310 of the compensating element 210, and a flange portion 632 is located on an inner side of a retaining flange 622. In the fastening assembly 610, the flange portion 632 abuts against an inner side surface 642 of the retaining flange 622, and a second axial end 655 of a sleeve portion 631 extends into a retaining hole of the retaining flange 622, and extends toward the outer side of the retaining flange 320 to be flush with or slightly beyond an outer side surface 644 of the retaining flange 320.

It should be noted that the isolating member according to the present disclosure may only comprise a sleeve portion, and does not comprise a flange portion. The flange portion is configured to prevent the isolating member from falling off the compensating element in one direction (the direction from right to left as shown in FIG. 5, and the direction from left to right as shown in FIG. 6), but since the sleeve portion of the isolating member is in an interference fit with the retaining ribs on the retaining hole of the compensating element via the outer surface of the sleeve portion, the isolating member can be effectively retained on the compensating element, and the isolating member is not easy to fall off the compensating element even if the flange portion is not provided.

FIG. 7 is a perspective view of the fastening assembly 110 shown in FIG. 2A that is pre-assembled with the first component 130. As shown in FIG. 7, the protrusion 720 on the hole wall of the first component 130 extends into the spiral groove 350 of the body 310 of the compensating element 210, and can move along the spiral groove 350. Since the first stop block 352 and the second stop block 356 are respectively arranged at two axial ends of the body 310 of the compensating element 210, the compensating element 210 does not fall out of the hole of the first component 130. Furthermore, since the second stop block 356 is provided on the deflectable arm 355, though the second stop block 356 is at one end of the body 310, the compensating element 210 can still be inserted into the hole of the first component 130 from the end of the body 310 provided with the second stop block 356. Thereby, the fastening assembly 110 of the present disclosure can be pre-assembled in the hole of the first component 130, instead of falling out of the hole. By means of pre-assembling the fastening assembly 110 to the first component 130, the fastening assembly 110 and the first component 130 can form a pre-assembled unit, which is beneficial for a manufacturer of the first component 130 to directly provide an assembly to an end user that can be used for final assembly. For example, where the first component 130 is a hidden door handle module of a vehicle, a manufacturer of the hidden door handle module can purchase the fastening assembly from the manufacturer of the fastening assembly, assemble the fastening assembly on the door handle module it manufactures, and then sell same to a vehicle manufacturer. In this way, the vehicle manufacturer can obtain an assembly from one supplier for final assembly, which facilitates production management and optimal allocation of various resources. The fastening assembly 110 pre-assembled on the first component 130 is not easy to fall off the first component 130, which thus facilitates the transportation and the mounting at a final assembly position of the pre-assembled unit formed by the first component 130 and the fastening assembly 110.

Figure 8:
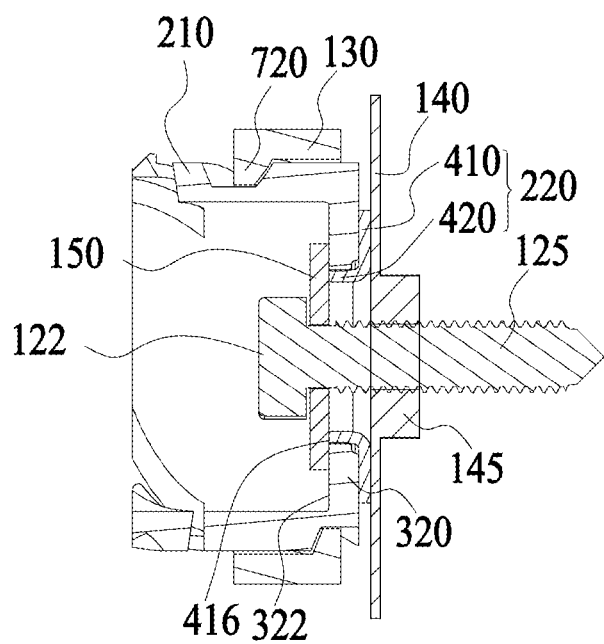
FIG. 8 is a sectional view of the fastening system shown in FIG. 1A taken in an axial direction, illustrating the system in a use state.

FIG. 8 is a sectional view of the fastening system 100 shown in FIG. 1A taken in the axial direction, illustrating the system in a use state. As shown in FIG. 8, when the fastening system 100 is mounted in place, the shaft portion 125 of the fastening element 120 extends into the nut device 145 of the second component 140, the shaft portion 125 and the nut device 145 are connected by means of threaded engagement, the isolating member 220 is securely clamped between the washer 150 and the second component 140 by means of an axial fastening force exerted by the fastening element 120, and thereby the first component 130 is fastened to the second component 140. When the fastening system 100 is mounted in place, the compensating element 210 is also fastened to the second component 140, however, the axial fastening force exerted by the fastening element 210 is mainly withstood by the sleeve portion 410 of the isolating member 220, instead of the retaining flange 320 of the compensating element 210, that is, the fastening element 210 fastens the compensating element 210 to the second component 140 via the sleeve portion 410 of the isolating member 220, and the sleeve portion 410 of the isolating member 220 can withstand the pressure exerted by the fastening element and the pressure exerted by the second component at two ends. Therefore, the axial fastening force exerted by the fastening element 120 is not withstood by the compensating element 210 made of plastic, or the compensating element 210 only withstands a small amount of axial fastening force, which increases the service life of the compensating element 210. As a comparative example, if the fastening assembly is not provided with an isolating member, but only has a compensating element, the axial force exerted by the fastening element is directly withstood by the retaining flange of the compensating element. As the usage time increases, the compensating element made of plastic creeps under the action of the axial fastening force, causing the fastening element to be no longer in a fastened state.

Those skilled in the art can understand that although the fastening system according to the illustrated embodiments of the present disclosure comprises a metal washer, in some other embodiments, the fastening system can also not comprise the metal washer, and it is only necessary to set the radial size of the head of the fastening element larger. The provision of the metal washer may facilitate the selection of the fastening element as a standard part.

Although the present disclosure is described in conjunction with the examples of embodiments outlined above, various alternatives, modifications, variations, improvements, and/or substantial equivalents that are known or current or to be anticipated before long may be obvious to those of at least ordinary skill in the art. Furthermore, the technical effects and/or technical problems described in this description are exemplary rather than limiting; therefore, the disclosure in this description may be used to solve other technical problems and have other technical effects and/or may solve other technical problems. Accordingly, the examples of the embodiments of the present disclosure as set forth above are intended to be illustrative rather than limiting. Various changes may be made without departing from the spirit or scope of the present disclosure. Therefore, the present disclosure is intended to embrace all known or earlier disclosed alternatives, modifications, variations, improvements, and/or substantial equivalents.

What is claimed is:

1. A fastening assembly for fastening a first component to a second component by cooperating with a fastening element, the fastening assembly comprising:
   a compensating element comprising a body and a retaining flange, the body having a first end with a first stop structure and a second end with a second stop structure opposite the first end, a spiral groove on an outer surface of the body, and having a receiving hole penetrating the first end and the second end, the retaining flange being provided at the first end of the body, the retaining flange extending inwardly from a hole wall of the receiving hole and having a retaining hole in axial connection with the receiving hole, the compensating element being configured to be connectable to the first component and movable in a longitudinal direction (Y) relative to the first component to compensate for a tolerance in the longitudinal direction (Y),
   wherein the second stop structure comprises a deflectable arm that extends generally parallel to the spiral groove; and
   an isolating member being made of metal, the isolating member comprising a sleeve portion, the sleeve portion defining a channel, the channel being configured such that the fastening element inserted from the second end of the body of the compensating element is capable of entering the channel and moving in the channel in one or more lateral directions (X, Z) perpendicular to the longitudinal direction (Y) to compensate for a tolerance in the one or more lateral directions (X, Z),
   wherein the sleeve portion is inserted into the retaining hole, and cooperates with the retaining hole to retain the isolating member on the compensating element; and
   wherein the fastening element fastens the compensating element to the second component through the sleeve portion, and the sleeve portion is configured to withstand an axial fastening force exerted by the fastening element on the retaining flange of the compensating element.

2. The fastening assembly according to claim 1, wherein: the sleeve portion has a first axial end and a second axial end opposite each other, one of the first axial end and second axial end withstands a pressure exerted by the fastening element, and the other of the first axial end and the second axial end withstands a pressure exerted by the second component.

3. The fastening assembly according to claim 2, wherein: the isolating member further comprises a flange portion protruding outwardly from the first axial end of the sleeve portion,
   wherein the flange portion is positioned on one of an outer side and an inner side of the retaining flange of the compensating element, and the second axial end of the sleeve portion extends into the retaining hole of the retaining flange and extends toward the other of the outer side and the inner side of the retaining flange to be flush with or slightly beyond a surface of the retaining flange on this side.

4. The fastening assembly according to claim 1, wherein: a plurality of retaining ribs are provided on the hole wall of the retaining hole, and an outer surface of the sleeve portion is in an interference fit with the retaining ribs, so as to retain the isolating member on the compensating element.

5. The fastening assembly according to claim 4, wherein: the plurality of retaining ribs are evenly arranged in a circumferential direction of the retaining hole, and each of the retaining ribs extends in the longitudinal direction (Y).

6. The fastening assembly according to claim 1, wherein: the body has a cylindrical shape, and the body connects the compensating element to the first component through the spiral groove; and
   the first stop structure and the second stop structure are configured such that the compensating element is capable of being inserted into a hole of the first component and blocking the compensating element from falling out of the hole of the first component to pre-assemble the fastening assembly to the first component.

7. The fastening assembly according to claim 6, wherein: one of the first stop structure and the second stop structure is a first stop block provided at an end of the spiral groove, and the other of the first stop structure and the second stop structure comprises a deflectable arm and a second stop block provided on the deflectable arm.

8. A fastening system for fastening a first component to a second component, comprising:
   the fastening assembly according to claim 1;
   a fastening element; and
   a nut device provided on the second component,
   wherein the fastening element engages with the nut device to fasten the first component to the second component.

9. The fastening system according to claim 8, further comprising:
   a metal washer being clamped between a head of the fastening element and the retaining flange.

10. A fastening assembly for fastening a first component to a second component in cooperation with a fastening element, comprising:
    a compensating element including a body having a first end, a second end opposite the first end, and a spiral groove on an outer surface of the body, the body having a receiving hole extending between the first end and second end;
    a retaining flange at the first end, extending inwardly from a wall of the receiving hole and defining a retaining hole axially aligned with the receiving hole;
    a first stop structure at the first end and a second stop structure at the second end, the second stop structure comprising a deflectable arm extending generally parallel to the spiral groove; and
    an isolating member made of metal, including a sleeve portion defining a channel, the channel configured to receive the fastening element inserted from the second end and allow movement of the fastening element in one or more lateral directions (X, Z) perpendicular to a longitudinal direction (Y) to compensate for a lateral tolerance.

11. The fastening assembly of claim 10, wherein the deflectable arm is connected to the body via a proximal end of the deflectable arm and a second stop block is provided on an outer surface of a distal end of the deflectable arm.

12. The fastening assembly of claim 11, wherein the deflectable arm is configured to deflect toward the receiving hole of the body under pressure to temporarily move the second stop block from a blocking position.

13. The fastening assembly of claim 12, wherein the deflectable arm is configured to elastically return to the blocking position upon release of the pressure.

14. The fastening assembly of claim 11, wherein the second stop block is configured to engage an inner wall of the hole of the first component to prevent removal of the compensating element from the second end of the body.

15. The fastening assembly of claim 10, wherein the deflectable arm is formed by an opening in the body and extends substantially parallel to the spiral groove.

16. The fastening assembly of claim 10, wherein two or more deflectable arms are provided on the second end of the body and are evenly spaced around a central axis of the body.

17. The fastening assembly of claim 10, wherein the first stop structure comprises a first stop block disposed at an end of the spiral groove, the first stop block being positioned in a travel path of a protrusion provided in the hole of the first component.

18. The fastening assembly of claim 10, wherein the sleeve portion is inserted into and retained within the retaining hole.

19. The fastening assembly of claim 10, wherein the fastening element fastens the compensating element to the second component through the sleeve portion, and the sleeve portion is configured to withstand an axial fastening force exerted by the fastening element on the retaining flange.

20. A fastening assembly for fastening a first component to a second component in cooperation with a fastening element, the fastening assembly comprising:

a compensating element including a body having a first end, a second end opposite the first end, and a spiral groove on an outer surface of the body, the body having a receiving hole extending between the first end and second end;

a retaining flange at the first end, extending inwardly from a wall of the receiving hole and defining a retaining hole axially aligned with the receiving hole;

a first stop structure at the first end and a second stop structure at the second end, the second stop structure comprising a deflectable arm extending generally parallel to the spiral groove, wherein the deflectable arm is connected to the body via a proximal end of the deflectable arm extends substantially parallel to the spiral groove, and wherein a second stop block is provided on an outer surface of a distal end of the deflectable arm; and an isolating member made of metal, including a sleeve portion defining a channel, the channel configured to receive the fastening element inserted from the second end and allow movement of the fastening element in one or more lateral directions (X, Z) perpendicular to a longitudinal direction (Y) to compensate for a lateral tolerance.

\* \* \* \* \*